Aug. 10, 1965 J. C. DANLY 3,199,443

AUTOMATIC TRANSFER MECHANISM FOR PRESS LINE

Filed March 26, 1964 10 Sheets-Sheet 1

INVENTOR

James C. Danly

Wolfe, Hubbard, Voit & Osann

ATTORNEYS

AUTOMATIC TRANSFER MECHANISM FOR PRESS LINE

Filed March 26, 1964

10 Sheets-Sheet 2

INVENTOR
James C. Danly

Wolfe, Hubbard, Voit & Osann
ATTORNEYS

Aug. 10, 1965 J. C. DANLY 3,199,443

AUTOMATIC TRANSFER MECHANISM FOR PRESS LINE

Filed March 26, 1964 10 Sheets-Sheet 3

INVENTOR

James C. Danly

Wolfe, Hubbard, Voit & Osann

ATTORNEYS

INVENTOR
James C. Danly
Wolfe, Hubbard, Voit & Osann
ATTORNEYS

INVENTOR
James C. Danly
Wolfe, Hubbard, Voit & Osann
ATTORNEYS

INVENTOR
James C. Danly
Wolfe, Hubbard, Voit & Osann,
ATTORNEYS

AUTOMATIC TRANSFER MECHANISM FOR PRESS LINE

Filed March 26, 1964

INVENTOR
James C. Danly

Wolfe, Hubbard, Voit & Osann,
ATTORNEYS

AUTOMATIC TRANSFER MECHANISM FOR PRESS LINE

Filed March 26, 1964 10 Sheets-Sheet 8

INVENTOR
James C. Danly
Wolfe, Hubbard, Voit & Osann
ATTORNEYS

AUTOMATIC TRANSFER MECHANISM FOR PRESS LINE

Filed March 26, 1964 10 Sheets-Sheet 9

INVENTOR
James C. Danly
Wolfe, Hubbard, Voit & Osann,
ATTORNEYS

AUTOMATIC TRANSFER MECHANISM FOR PRESS LINE

Filed March 26, 1964

10 Sheets-Sheet 10

INVENTOR
James C. Danly
Wolfe, Hubbard, Voit & Osann
ATTORNEYS 3,199,443
Patented Aug. 10, 1965

3,199,443 AUTOMATIC TRANSFER MECHANISM FOR PRESS LINE

James C. Danly, River Forest, Ill., assignor to Danly Machine Specialties, Inc., Chicago, Ill., a corporation of Illinois Filed Mar. 26, 1964, Ser. No. 354,954
16 Claims. (Cl. 100—207)

The present invention relates to power presses and more particularly to a press line capable of automatically performing a series of press operations on a workpiece.

Efforts have been made in the past to provide for automatic transfer of a workpiece in a series of presses. However, these efforts have not been altogether successful since the presses, individually driven have tended to get out of the desired phase relation. To guard against mishap it has been necessary in many cases to provide a rather elaborate set of interlocks between the presses so that one press triggers the operation of another or of an adjacent conveyor. When this is done it is necessary to operate the presses in the "run" mode which requires separate triggering for each downward stroke with the result that the line must be operated at relatively slow speed.

In the press line to be described a series of power presses are provided with conveyors extending from one to the next and with each press having a first transfer mechanism for loading a workpiece from the input side of the conveyor into the press work area and a second transfer mechanism for unloading the workpiece from the work area to the conveyor at the output side for automatic transport of the workpiece down the line.

It is an object of the present invention to provide a press line having novel provision for synchronizing all of the press and functions permitting the press to run in the "continuous" mode at high speed. It is a more specific object to provide a press line in which the transfer devices and adjacent conveyor are kept in synchronization with the press slide by a positive and direct mechanical coupling and in which adjacent presses are synchronized by novel control circuitry. In this connection it is an object to provide a press line having conveyors extending between the adjacent presses which are indexed forwardly for dwell at the points of pickup and dropoff of the workpiece thereby to insure proper engagement and disengagement of the workpiece by the transfer mechanisms notwithstanding minor variations in synchronization between the press drives.

It is another object of the invention to provide a novel transfer mechanism integrated with a power press and capable of moving a workpiece along an accurately timed and predetermined path of movement for clearance of the press slide and other obstructions while effecting transfer in the shortest possible time. In this connection it is an object to provide a transfer mechanism capable of transporting the workpiece along a shallow "arched" path and in which cams, fixed mechanically together, are provided for accurately determining the horizontal and vertical components of movements on both the forward and return paths. It is a related object to provide a transfer mechanism for a power press in which the path is variable over wide limits within a rectangular envelope, simply by substituting a pair of cams having a different contour.

It is an object of the invention in one of its aspects to provide a transfer mechanism which is versatile and which is capable of handling a wide variety of workpieces and which permits the approach and retreating movements of the transfer arm to be tailored precisely to the type of gripping element being used to permit gripping and releasing without disturbing the position of the workpiece either on the conveyor or the press.

It is another object of the present invention to provide a transfer mechanism for a power press which is safer than prior devices, with the transfer arm in a folded back position under the supporting bracket out of the way of attending personnel. It is moreover an object to provide a construction which is self-protecting upon the accidental striking of an obstruction in the path of movement thereby preventing damage to the drive mechanism or to the press itself.

It is another object of the present invention to provide a transfer and conveyor mechanism for a press line in which the mechanism is positioned between adjacent presses but which permits the entire mechanism to be moved into an out-of-the-way position closely adjacent the upper portion of the press thereby freeing the space between the presses for access by a crane hook for changing the dies or for performing other work on the press.

It is an object of the invention in one of its aspects to provide a mechanized press line having a novel conveyor arrangement permitting two or more types of workpieces to be acted upon without necessity for attaching a new set of carriers and with a simple adjustment in the phase position of conveyor movement.

It is an object of the invention in one of its aspects to provide a novel transfer mechanism for transferring a workpiece through a line of power presses in which the workpiece is conveyed directly from one transfer mechanism to the next directly and without necessity for intermediate conveying on a conveyor belt or the like. It is a more specific object to provide a press line having a plurality of reciprocating transfer mechanisms with two sets of gripping elements spaced longitudinally along the path of movement between adjacent stations so that each transfer mechanism is effective to advance two workpieces over successive station intervals during only one cycle of reciprocation.

Finally it is an object of the present invention to provide a mechanized press line which is not only accurate but which is durable, capable of operating over long periods of time without care or maintenance and with minimum risk of breakdown, making it especially suited for use in the intensive production of specialized parts required in the automotive industry.

Other objects and advantages of the invention will become apparent upon reading the attached detailed description and upon reference to the drawings, in which.

While the invention has been described in connection with a preferred embodiment, it will be understood that I do not intend to limit the invention to the embodiment shown but intend to cover the various alternative and equivalent constructions included within the spirit and scope of the appended claims.

Figure 1:
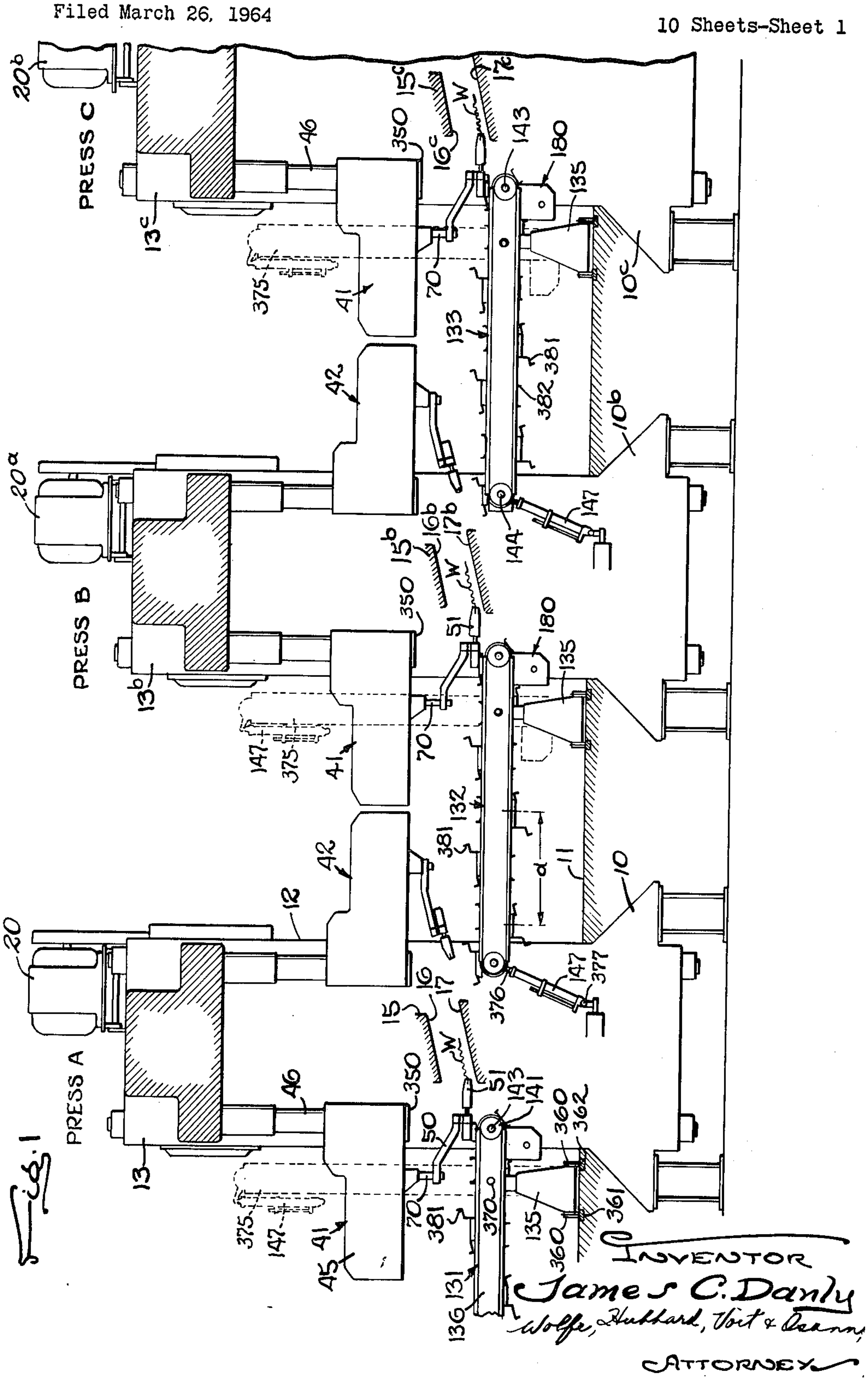
FIGURE 1 is a side elevation, partly diagrammatic, showing a press line incorporating the present invention.

Turning now to the drawings and particularly to FIG. 1, there is shown a portion of an automated press line intended for performing successive operations upon a workpiece W, for example, an automotive radiator grill. For purposes of illustration, only three presses have been shown, indicated press A, press B, and press C, together with their associated transfer and conveyor mechanisms, and it will be understood that the press line may in practice be extended to include any number of similar units in accordance with the present teachings. Taking press A by way of example, it includes a massive base 10 extending below the floor 11 and an upwardly extending frame 12 topped by a crown 13. Reciprocatingly mounted in the press frame is a slide diagrammatically indicated at 15 with cooperating upper and lower dies 16, 17 driven by a press driving motor 20.

Knowledge of only the main elements of a power press will permit full understanding of the present invention and for the details of a commercial or practical press, cross reference may be made to the trade literature and descriptive brochures of press manufacturers. It will suffice, therefore, to refer to the press driving elements but briefly, reference being made to FIG. 3 which is a diagrammatic perspective view of the drive mechanism. The motor 20 is shown feeding a step down drive connection including a belt 21 and pulleys 22, 23. Pulley 23 is connected to a clutch 25 having an input shaft 26, an output shaft 27 and slip rings 28. The clutch output shaft is coupled to an output pinion 30 which drives a pair of intermediate gears 31, 32 which mesh with the main press drive gears 33, 34, respectively. In a conventional press such gears are connected to the press pitman and the movement and phasing of the slide are under the joint control of timing cams and operating pushbuttons which, through appropriate and interlocked circuitry, control the energization of the clutch 25. In a subsequent section, setting forth control circuitry forming a part of the present invention, operation in the "continuous" mode will be described. However, it will be understood that for setting up the press and for safety purposes it is desirable to have the press controllable in the "inch" and "run" modes in addition to the "continuous" mode. Circuitry permitting operation in all three modes is disclosed in copending application Ser. No. 169,527, filed January 29, 1962. In the subsequent presses B and C in the line, corresponding reference numerals, with the addition of subscripts "*b*" and "*c*" respectively, have been employed to represent corresponding parts.

In accordance with the present invention, each of the presses is equipped with novel loading and unloading transfer mechanisms, the first for moving workpieces into the working area from the input side and the second for moving workpieces out of the working area at the output side. Taking press A by way of example, the first or loading transfer mechanism is indicated at 41 and the second or unloading transfer mechanism is indicated at 42. Since the two transfer mechanisms are substantial duplicates of one another, differing only in the programmed movement, primary reference will be made to the mechanism of 41 at the input. The mechanism includes a supporting frame 45 in the form of a bracket which extends, cantilever fashion, from the input side of the press, being supported from a vertically depending post 46 which, in turn, is anchored to the crown 13 of the press. Extending in folded back relation under the bracket 45 is a transfer arm 50 having a gripper 51 for gripping a workpiece W and for depositing it on the lower die 17.

Figures 10, 11:
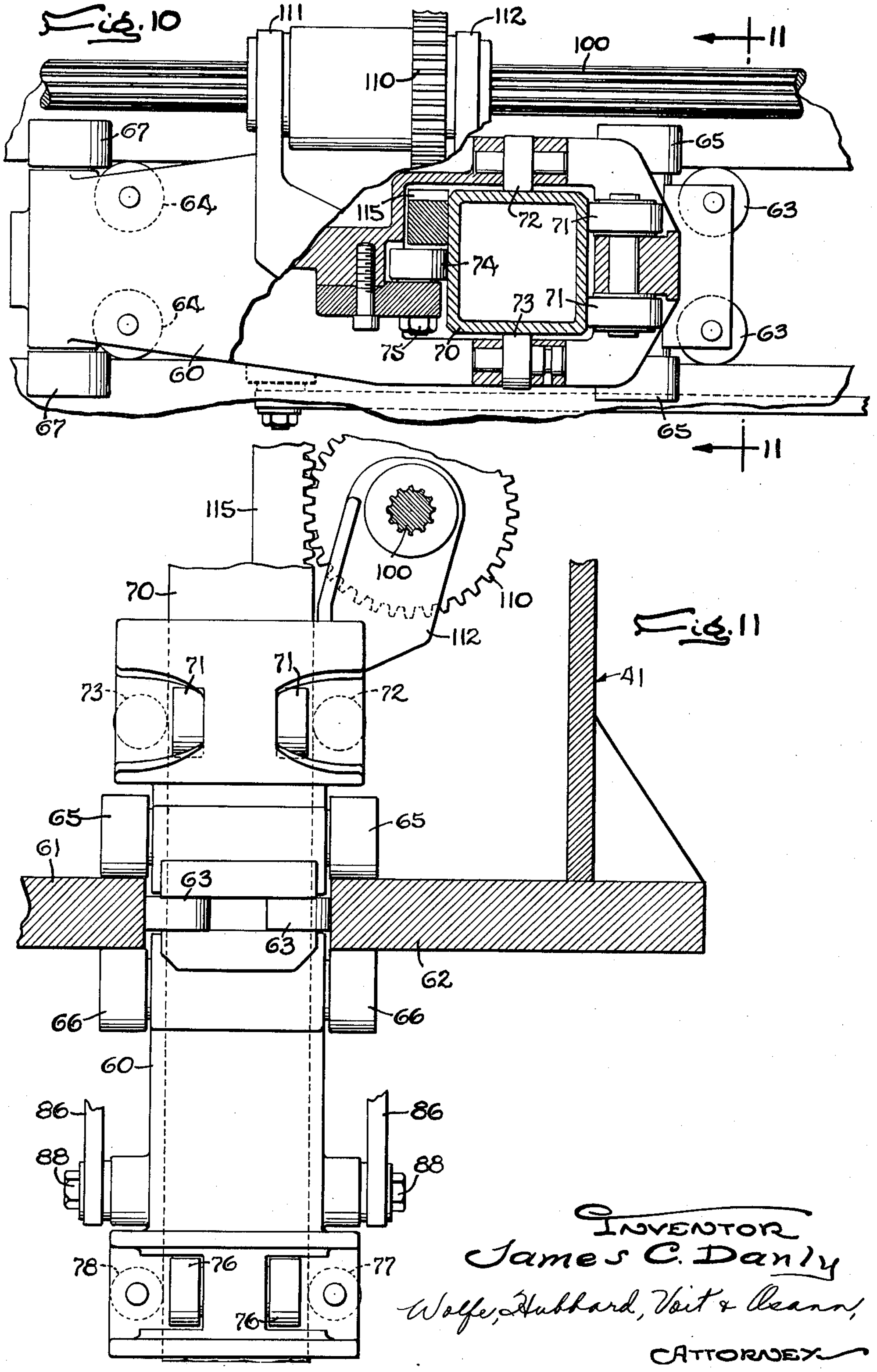
FIG. 10 is a fragmentary section taken through the supporting post and carriage for the transfer arm along the line 10—10 of FIG. 4.
FIG. 11 is a fragmentary vertical section showing the post drive taken along the line 11—11 in FIG. 10.

For transporting the arm 50 for horizontal movement, a carrier 60 is provided which is rollably secured upon, and guided by, a pair of ways 61, 62 which extend the length of the bracket 45 and which in the present instance constitute the bottom wall thereof. The carrier is maintained centered between the opposed surfaces of the ways by rollers 63 at the inner end and rollers 64 at the outer end (see FIG. 10). To hold the carriage captive against vertical movement with respect to the ways, horizontal pairs of rollers 65, 66 are provided at the inner end engaging the upper and lower way surfaces, respectively, while corresponding pairs of rollers 67, 68 serve to guide the outer end. It will be apparent that with the rollers 63–68 drawn up against their guide surfaces, the carrier is positively guided for horizontal movement completely free of any possibility of twisting or binding.

For the purpose of imparting a vertical component of movement to the arm 50, the arm is secured to a square, hollow supporting post 70 having machined sides and which is guided for vertical movement in the carriage. The upper end of the post is engaged on its four sides by rollers 71–74, roller 74 being mounted eccentrically as shown at 75 for takeup purposes. A similar set of rollers 76–79 respectively are employed at the lower end of the carriage so that all of the rollers, acting together, constrain the post 70 to precise vertical movement.

In accordance with one of the aspects of the invention, means including a pair of profiled cams mounted on the same input shaft are provided for imparting coordinated, horizontal and vertical components of motion to the post 70 and the transfer arm 50 which is connected to it. Thus transversely arranged in the base portion of the bracket 45 is an input shaft 80 having a first cam 81 and a second cam 82 rigidly secured thereto and arranged side by side. Riding upon the outer edge of the cam 81 is a cam follower roller 83 which is secured to a depending, horizontally pivoted motion arm 84 which is pivoted at its upper end 85. The lower end of the motion arm is connected to a yoke 86 formed of a pair of links straddling the carriage, the yoke being pivoted at 87–88. In carrying out the invention a yieldable connection is provided in order to safely arrest forward motion of the transfer arm 50, i.e., motion into the press, in the event of striking an obstruction. This is accomplished by an air ram 90 secured to a bracket 91 and having a piston rod 92 connected to the cam follower roller 83 and arm 84. Sufficient air pressure is furnished to the air ram to insure that the cam follower roller 83 remains in contact with the cam for all normal operation. It will be apparent, then, that as the input shaft 80 rotates, the cam 81, acting upon the cam follower roller causes the motion arm 84 to swing backwardly and forwardly accompanied by backward and forward movement of the transfer arm 50 in accordance with a certain program of horizontal movement and depending upon the cam profile.

For the purpose of imparting vertical movement to the post 70, the control cam 82 is engaged by a cam follower roller 93 which is pinned to a motion-arm 94 which is pivoted to the bracket at pivot 95. Secured to the end of the arm 94 is a link 96 having an upper pivot 97 and a lower pivot 98. To conduct the movement of the link to the carriage 60, regardless of the horizontal position of the carriage, a longitudinally extending spline shaft 100 is provided journaled at its ends 101, 102, respectively.

The shaft is rotated by a bevel pinion 103 secured to the forward end which meshes with the bevel gear 104 which is rockingly coupled to the linkage previously described. Telescoped over the spline shaft 100 and slidable thereon is a post gear 110 journaled in brackets 111, 112 on the carriage. A rack 115, secured to the post 70, meshes with the gear. Means similar to that previously described are provided for maintaining the cam follower 93 in contact with the cam 92. Thus I employ an air ram 120 which is anchored at its end 121 and which has its piston rod pinned at 122 to the vertical motion arm 94. Thus, as the input shaft 80 is rotated, rocking of the cam follower 93 produces similar rocking movement of the bevel gear 104 and rotation of the splined shaft 100 which, acting through the sliding gear 110 and the rack 115 imparts vertical movement to the post 70.

Figure 12:
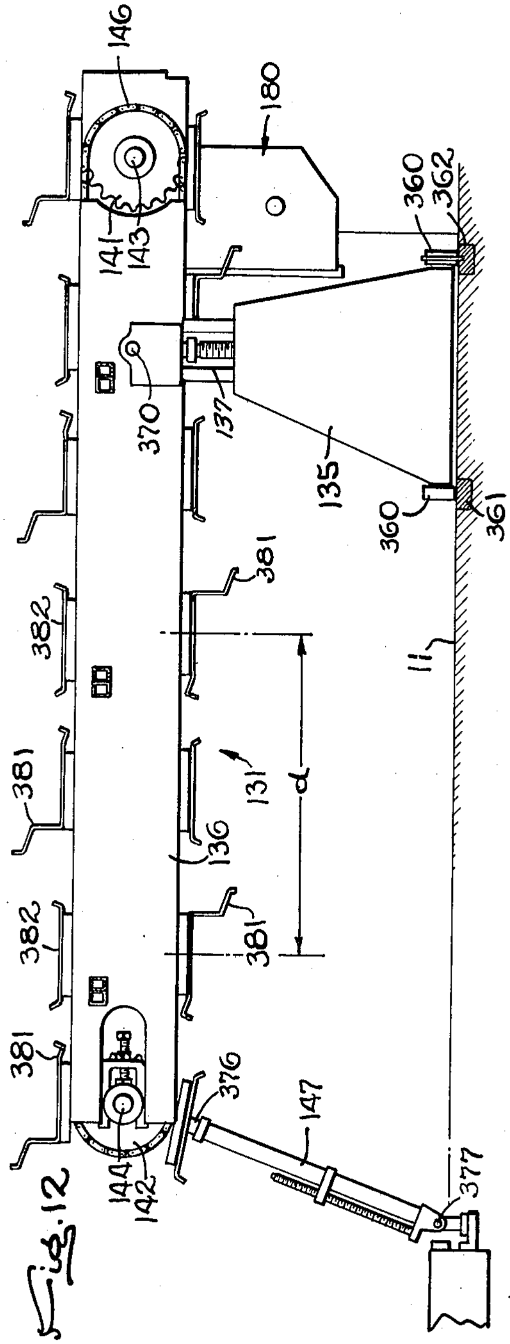
FIGS. 12 and 13 are side and top views of a conveyor.
Figure 13:
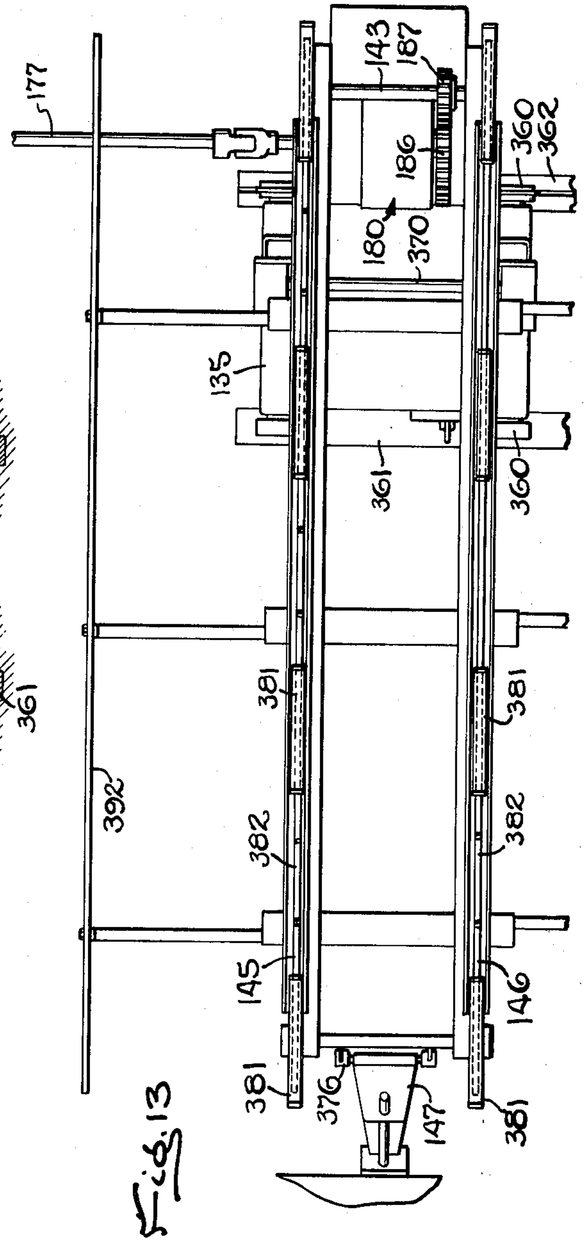

Conveyors are provided leading to the first press and bridged between the presses for conveying the workpieces and for positioning the workpieces for convenient and accurate gripping by the transfer arms of the adjacent transfer mechanisms. I thus provide an input conveyor 131 and successive conveyors 132, 133. Since the conveyors are substantial duplicates of one another, it will suffice to describe the conveyor 131 as shown in FIGS. 12 and 13. At the end of the conveyor adjacent the press A a supporting base structure 135 is provided supporting a conveyor frame 136 which normally extends horizontally as shown. Journaled at the ends of the frame 136 are a first set of conveyor sprockets 141 and a second set of conveyor sprockets 142 secured to axles 143, 144 respectively. Trained about the sprocket wheels on each side of the conveyor are sprocket chains 145, 146. The overhanging end of the conveyor frame is supported by a supporting post 147. It will be understood that the supports 137 at the "near" end and 147 at the "far" end of the conveyor have suitable provision for adjusting the level of the conveyor frame depending upon the size and configuration of the workpiece being handled.

In accordance with one of the aspects of the present invention the transfer mechanisms at the input and output sides of a given press and at least one of the associated conveyors are directly coupled to the press drive for movement which is precisely coordinated with the movement of the press slide. Moreover, means are provided for substantially synchronizing the phase position of the outputs of the respective press drives, and the conveyors are each provided with an intermittent drive coupling to establish a dwell period at the points of loading and unloading of the workpieces thereby to insure proper engagement and disengagement of the workpiece notwithstanding any minor variation in synchronism which may exist between the outputs of the drives of the adjacent presses. The means for establishing synchronism in the phase position of the outputs of the press drives will be discussed at a later point in connection with FIGS. 14 and 15. For the moment, attention will be focused upon the mechanism for effecting the coordinated driving of the transfer mechanisms and conveyors by the drive of the associated press.

Figure 3:
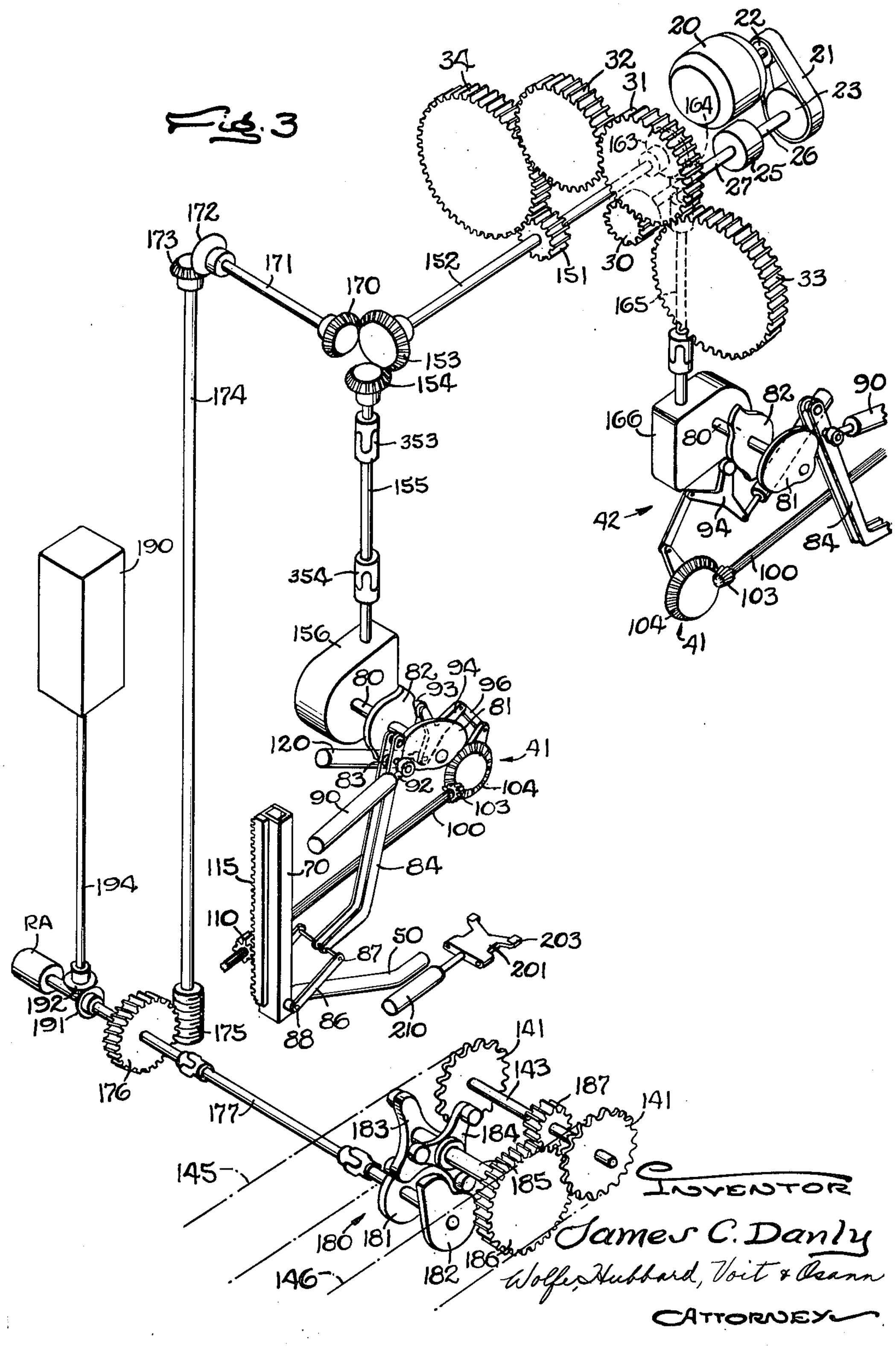
FIG. 3 is a diagrammatic perspective view of the driving mechanism of one press in the line.

Thus referring to FIG. 3, one of the main press drive gears, in this case the gear 34, is meshed with a power takeoff pinion 151 secured to a horizontally extending power takeoff 152. For driving the first transfer mechanism 41 the power takeoff shaft is coupled, via bevel gears 153, 154, to a vertical shaft 155 leading to a speed reducer 156 which may be of any type capable of producing an appropriately reduced output speed at the drive shaft 80 leading to the horizontal and vertical positioning cams 81, 82 previously discussed. At the other end of the shaft a similar pair of bevel gears 163, 164, transmits power to a vertical shaft 165 feeding a speed reducing device 166 which drives the shaft 80 and which serves to rotate the positioning cams in the second transfer mechanism 42.

For direct coupling to the drive of the conveyor 131, a bevel gear 170 is provided meshing with the bevel gear 153 and having a horizontal shaft 171 which is coupled, via a pair of bevel gears 172, 173, to a vertical conveyor driving shaft 174. At its lower end the latter carries a worm gear 175 meshing with a worm wheel 176 powering a horizontal conveyor drive shaft 177. For producing intermittent or indexed movement of the conveyor to provide a dwell period of the workpiece at the point of pickup by the gripper on the transfer arm an intermittent drive unit 180 of the roller-drive controlled-acceleration type is used. As set forth in FIG. 3, the unit includes first and second cams 181, 182 having three legged cam followers 183, 184, with rollers mounted at the ends of the legs. The cam followers are secured to an output shaft 185. In operation, each time one of the cam members rotates it advances the associated cam follower through an arc of movement which, in the present instance, is one-twelfth of a revolution of the output shaft. Since two cams and cam followers are employed in offset phase relation, the output shaft 185 is advanced in increments with a net stepdown ratio of 6:1. The cams are profiled to produce a dwell period of approximately 50%, i.e., equal to the period during which advancement takes place. To transmit this intermittent motion to the conveyor chains, an output gear 186 is secured to the shaft 185 and meshes with a drive pinion 187 on conveyor sprocket shaft 143. The over-all ratio is such that as the conveyor belt advances a distance *d* (FIG. 12) for each step of advance of the intermittent drive mechanism 180.

Figures 14, 15:
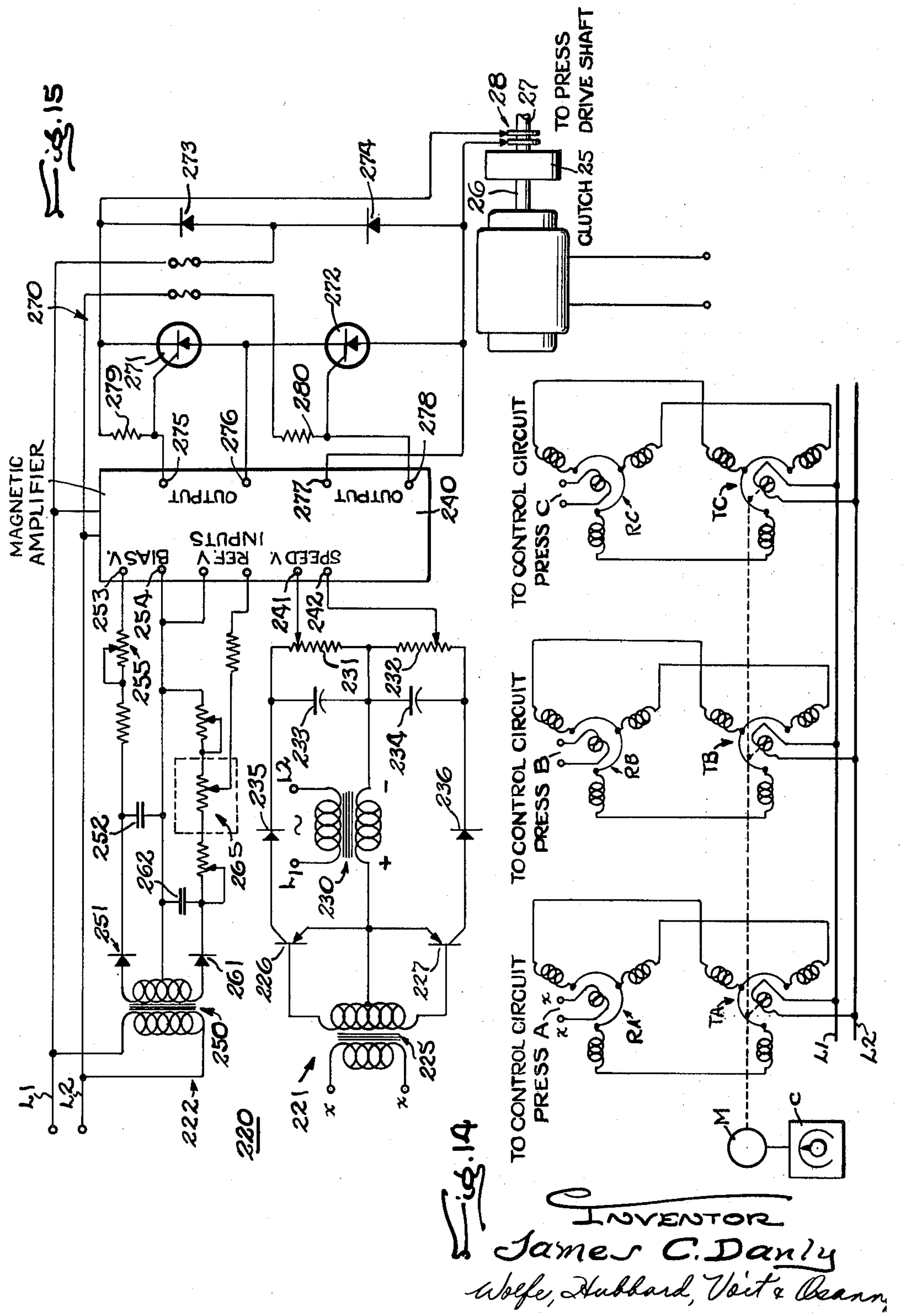
FIG. 14 is a schematic diagram showing the synchros employed to synchronize the press drives.
FIG. 15 is a schematic diagram showing the clutch control circuit energized by one of the synchros in FIG. 14.

Also shown in FIG. 3 are the elements sensitive to the press phase position, namely the timing cam assembly shown diagrammatically at 190, which may correspond to timing cams used for interlock purposes in a regular power press, and synchro RA used to energize the control circuit to be discussed later in connection with FIG. 15. The timing cam assembly is drive via bevel gears 191, 192 which rotate a vertical shaft 194.

Figures 6, 7, 8, 9:
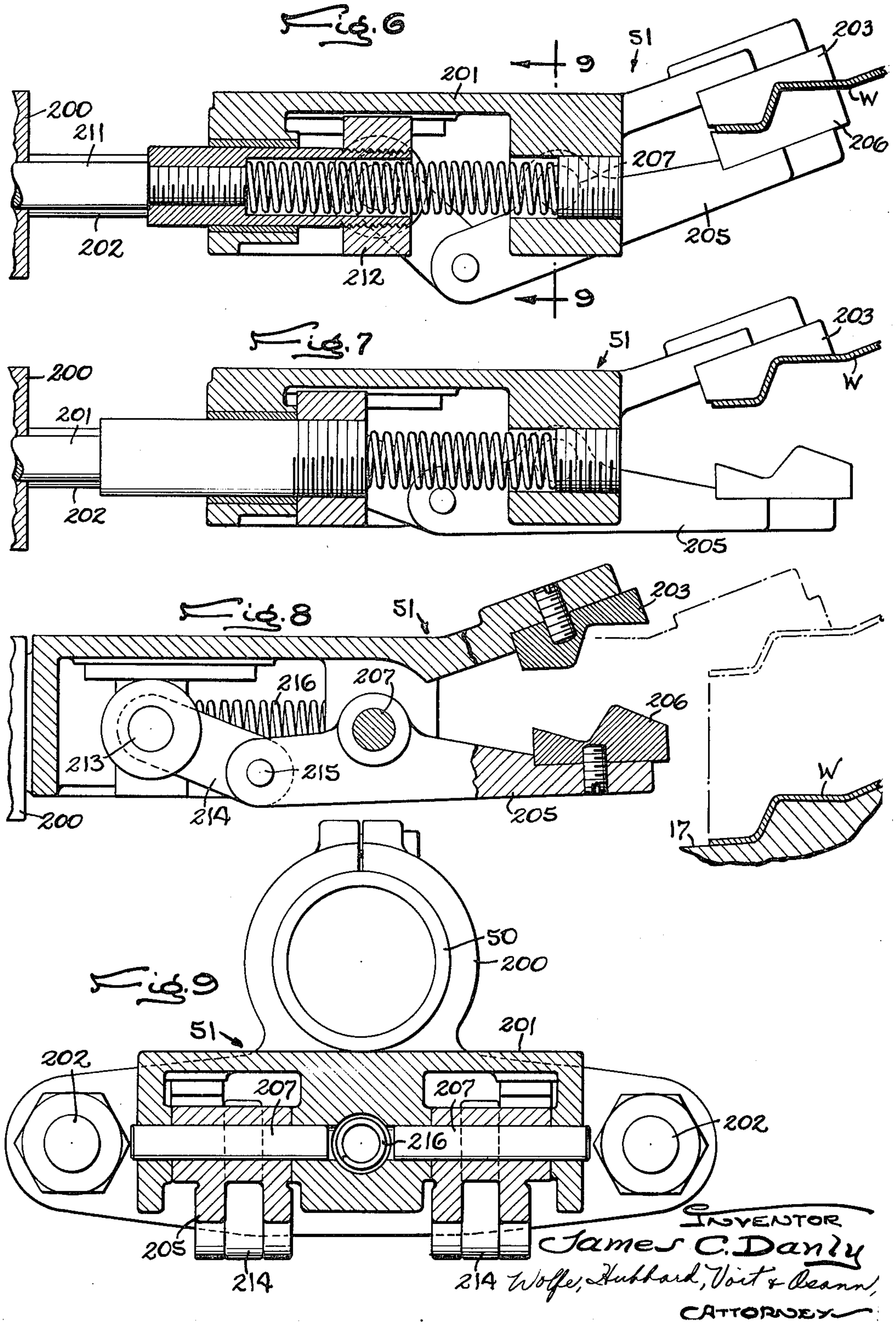
FIGS. 6, 7 and 8 show the gripping mechanism in the clamped, unclamped and retracted states.
FIG. 9 is a transverse section taken along the line 9—9 in FIG. 6.

Having reviewed the mechanism provided for moving the transfer arm 50, attention may now be given to the construction of the gripper at the end of the arm which grips the workpiece *w*. The gripper includes a base 200 which is clamped to the end of the arm 50 and a jaw extension 201 slidably mounted on posts 202 and which provides a first pair of laterally spaced jaw elements 203. A lower, movable jaw member 205 having a pair of correspondingly spaced jaw elements 206 is mounted for rocking movement on a horizontally extending pin 207. For sequentially extending and actuating the jaws, an air ram 210 is provided on the base 200 having a piston rod 211 terminating in a slide 212 which is movable back and forth in the extension 201. Pinned to this slide at 213 is a link 214 having a pivot connection 215 with the lower end of the movable jaw member 205. A spring 216 pressing against the slide 212 tends to bias the jaws toward the open position. When air is applied to the ram 210 for extending movement via a suitable air line (not shown) the extension 201 is moved outwardly followed by movement of the slide so that closing torque is transmitted to the movable jaw by the link 214 as shown in FIG. 6. When the movement of the ram is reversed, the movable jaw is free to spring to the open position shown in FIG. 7 followed by retraction as in FIG. 8. It will be understood that the particular clamping device discussed above, while constituting a preferred construction, is nevertheless simply exemplary of the many different specific kinds of work-engaging clamps including suction cups, inflatable fingers and the like which may be used to carry out the present invention.

*Synchronizing control circuit*

For the purpose of synchronizing the phase position at the output of each of the press drives, each press motor is equipped with output control means. In the present instance, the output control devices are the respective variably energizable drive clutches, the control circuit set forth in FIGS. 14 and 15 being employed. FIG. 14 shows the synchro circuit for producing an output signal depending upon the press phase position and FIG. 15 shows a circuit for responding to the output signal in order to vary the amount of exciting current applied to the clutch connected to the drive motor.

For establishing a reference phase position, a timing motor M is used coupled to transmitting synchros TA, TB and TC energized from supply lines L1, L2 and which feed receiving synchros RA, RB, RC controlling the drive mechanisms of the respective presses. The motor which drives the transmitting synchros may be of any desired type having a settable speed controller *c* capable of maintaining a constant, but adjustable, output speed. It will be understood by one skilled in the art that when the drives of the three presses are rotating at the desired speed and phase position, the output signal of the receiving synchros will be zero, whereas a departure from the desired phase position will produce an output signal which varies in magnitude and phasing depending upon the amount and direction of the offset.

The control circuit 220 may be considered to have two portions, the first or input portion 221 in the form of a discriminator for converting the synchro output signal to a D.-C. voltage of corresponding magnitude and polarity and a second portion 222 which furnishes a reference voltage. Turning first to the discriminator, the unit includes an input transformer 225 having a center tapped secondary winding feeding the input circuits of transistors 226, 227. The output circuits of the transistors are energized by a transformer 230 in the central leg of the circuit in series with respective loading resistors 231, 232. The latter are shunted by capacitors 233, 234 respectively. Diodes 235, 236 are included in the load circuit to protect the transistors against reverse voltage. The transformer 230 which furnishes current to the transistor output circuits has its primary connected to the same supply lines L1, L2 which energize the transmitting synchros. Under conditions of balance, i.e., where the interconnected transmit receiving synchros are rotating in precise phase position, there is no output signal across the load resistors 231, 232. However, upon departure from the in-phase condition, an A.-C. input signal is generated which is of either direct or opposite phase depending upon whether the speed of the controlled press drive is tending to lead or lag. Where the input signal is of "leading" phase, the conditions are met before conduction in one of the two transistors, say the transistors 226, producing a direct voltage across the load resistor 231. Where the input signal is of "lagging" phase, conditions are met for conduction in transistor 227 producing a direct voltage across its load resistor 232. The net voltage is applied to input terminals 241, 242 of a magnetic amplifier 240.

For the purpose of providing bias to the magnetic amplifier, a transformer 250 is provided having a rectifier 251 and filter capacitor 252, with the output voltage being applied to the bias terminals 253, 254. The amount of bias is under the control of a series rheostat 255. A somewhat similar circuit is used to provide reference voltage to a rectifier 261 having a filter capacitor 262 feeding reference terminals 263, 264 and with the amount of the reference voltage being settable by a resistor network 265. For further amplifying the output of the magnetic amplifier, a power amplifier circuit 270 is used in the form of a controlled bridge rectifier made up of silicon controlled rectifier units 271, 272 and noncontrolled rectifiers 273, 274 feeding clutch slip rings 28. The rectifier 271 has its gate-anode or firing circuit connected across output terminals 275, 276 while the rectifier 272 has its firing circuit connected across output terminals 277, 278. Resistors 279, 280 connected between gate and cathode are conventional to provide a path for the reset current and to insure that the rectifier turns off during the reverse part of the power cycle.

Since the circuit 270 is conventional, it will suffice to describe it briefly. At low values of signal from the magnetic amplifier the flow of output signal is blocked until late in the cycle in the A.-C. wave so that little current is conducted during the effective half cycle. With higher voltages applied to the gate electrode, the device is turned on during substantially the entire forward portion of the conducting cycle and offers low resistance to current flow so that substantially full current flows through the eddy current clutch 25. Intermediate values of input voltage to the controlled rectifiers result in intermediate values of current in the clutch. The circuit 270 provides large current amplification since as little as 50 milliamperes in the gating circuit is capable of controlling clutch currents of 16 amperes or even higher.

The magnetic amplifier 240, while not described in detail, will be understood to be conventional. The overall effect of the control circuit shown in FIG. 15 is to produce a corrective change in the amount of current flowing through the clutch depending upon the magnitude and phase of the input signal. Thus where there is a tendency for the press drive to exceed the speed for which the control motor M has been set, the change of phase between the synchros produces an output signal which acts to reduce the amount of current flowing through the clutch thereby to bring the speed of the press back to the set value. Conversely, in the event that the speed of the press drive tends to lag, a control signal of opposite phase, acting through the amplifier circuit of FIG. 15, produces a corrective increased flow of current through the clutch 25 thereby bringing the speed up to the set value. It is found that by using a control circuit of the type described with each of the press units, such press units may be kept in close phase synchronism with the master control motor, and hence with one another. Thus while each of the presses in the line drives only one of the two conveyors associated with the particular press, the adjacent presses remain in close enough phase synchronism so as to cooperate with the transfer mechanism to which it is not directly coupled. By providing a conveyor dwell period which is substantial, corresponding to 180° of rotation of the main press shaft, any minor discrepancy between the phase positions of adjacent presses is readily accommodated; in other words there is a substantial phasing safety factor.

Moreover, since the movements of the transfer arms are directly and precisely tied to the movements of the slide, it is found that clearances between the approaching or retreating slide, on the one hand, and the workpiece and gripper portion of the transfer arms on the other, may be reduced to a minimum with perfect safety.

Figure 16A:
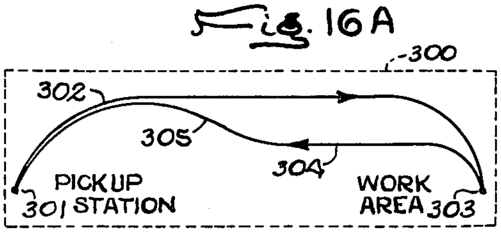
FIGS. 16A and 16B show typical loading and unloading paths.
Figure 16B:
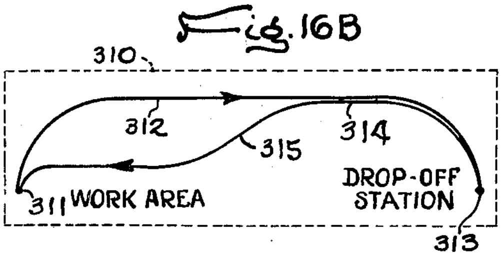

It is one of the features of the present construction that a wide variation is permissible in the horizontal and vertical components of movement enabling optimum path of travel for the workpiece and type of gripper being used, and requiring simply substitution of a pair of cams 81, 82 having a profile which is capable, when operated through the linkage, to produce the motion with a high order of positional accuracy. By way of illustration there is set forth in FIG. 16A a preferred path of movement of the transfer arm 50 which serves to load workpieces on the conveyor 131 and into the working area of the press. In this figure the envelope of the movement, indicated at 300 by the dot-dash outline, represents the extreme limits of available horizontal and vertical movement. In a practical case the movement may start at pickup station 301 at which point the gripper grips the workpiece on the conveyor. The entire workpiece is elevated along an arched path 302 and deposited in the working area at the end of the forward stroke as indicated at 303. The arm and gripper are immediately withdrawn at a lower level along a path 304 in order to clear the advancing slide, and, upon clearing the slide, the gripper is again elevated as indicated at 305 on its way back to the initial position. Any desired means may be used for triggering movement of the gripper jaws or points 301, 303, for example, a switch contact in the cam switch assembly 190 may be used. While the movement of the gripper arm at the ends of its arched path has a large vertical component, the auxiliary horizontally directed movement of the gripper assembly insures positive gripping and release of a flange on the workpiece. In the case of the transfer mechanism 42 at the output side of the press, the movement (FIG. 16B) has a similar outline 310 with the motion beginning at point 311 in the working area and with the workpiece being lifted along an arched path 312 for depositing at drop-off station 313 on the conveyor at the output side. The gripper returns along an arched path 314 dropping in level as indicated at 315 in order to get the gripper under the retreating slide and into the working area in the shortest possible time. The pickup and drop-off stations may be referred to collectively as "storage" stations.

Figure 17A:
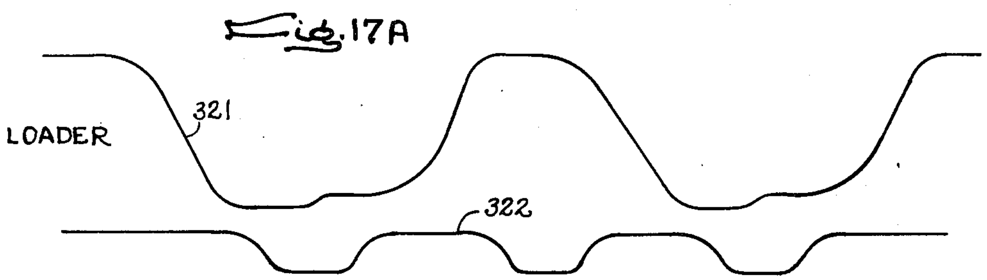
FIGS. 17A, 17B and 17C are set of timing diagrams showing the coordination of the horizontal and vertical movements of the loading, unloading and energizing mechanisms respectively.
Figure 17B:
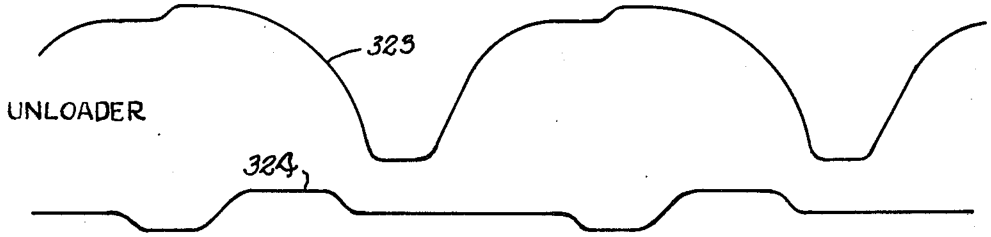
Figure 17C:
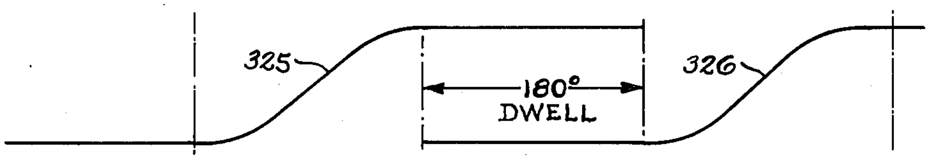

In order to show the design of the cams required in a typical case, the horizontal and vertical components have been separately plotted at 321, 322 in FIG. 17A and 323, 324 in FIG. 17B. The corresponding movements of the conveyors on the input and output side are indicated at 325, 326 in FIG. 17C which shows the dwell on both the conveyors at the extremes of transfer arm movement. It will be apparent from these figures that the dwell is sufficient to accommodate variations in phasing of adjacent presses by wider margin than will normally be encountered in a practical installation. As a result it is possible to operate all the presses in the "continuous" mode with the slides cycling continuously at a speed on the order of fifteen strokes per minute hour after hour as long as workpieces are fed into the press line. As stated there is no necessity for any interlocks between adjacent presses with one press triggering the motion of another, a factor which has limited the top speed of the press lines employed in the past.

Figure 2:
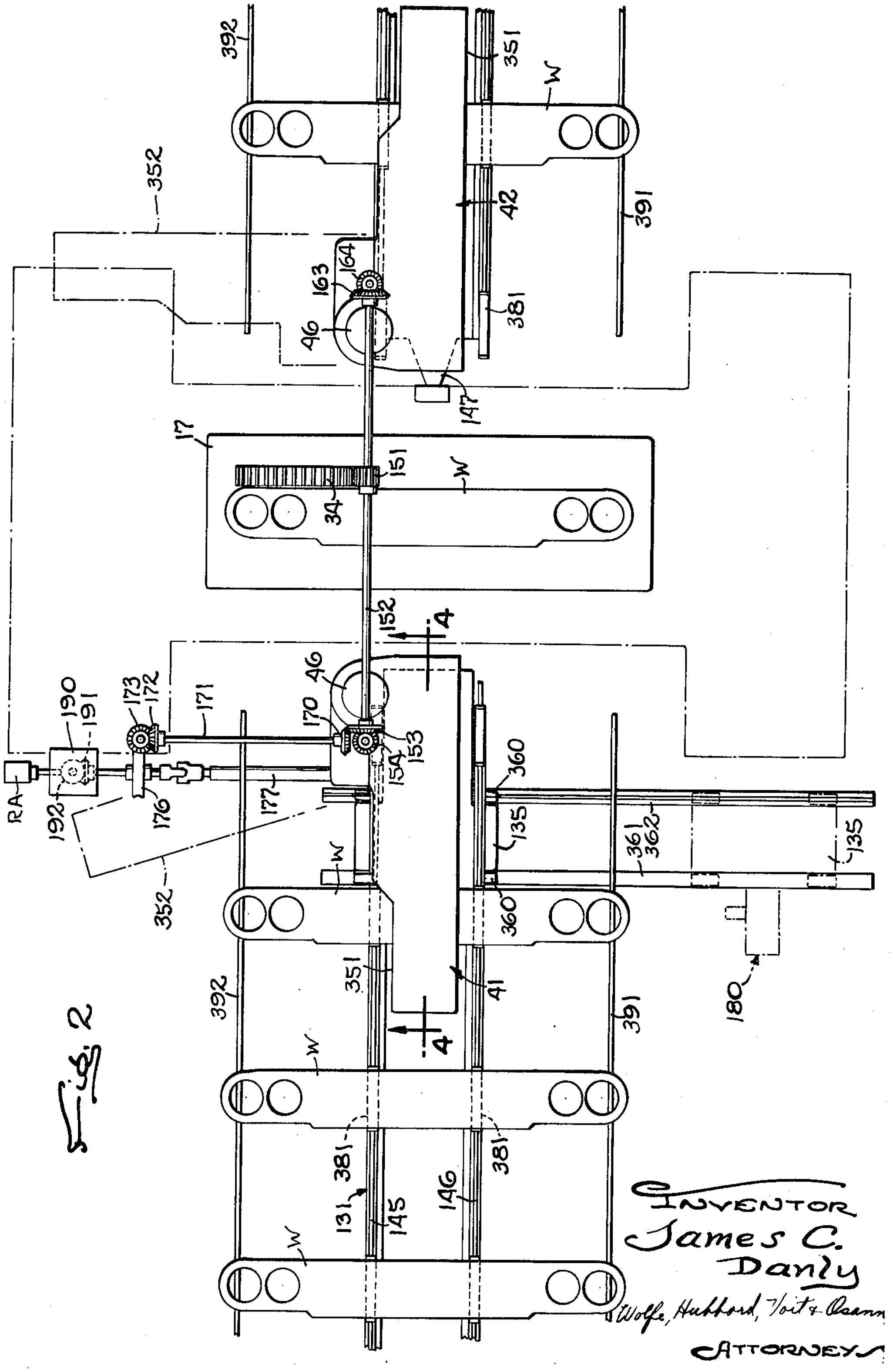
FIG. 2 is a phantom top view of one of the presses in the press line and showing a portion of the driving mechanism.
Figures 4, 5:
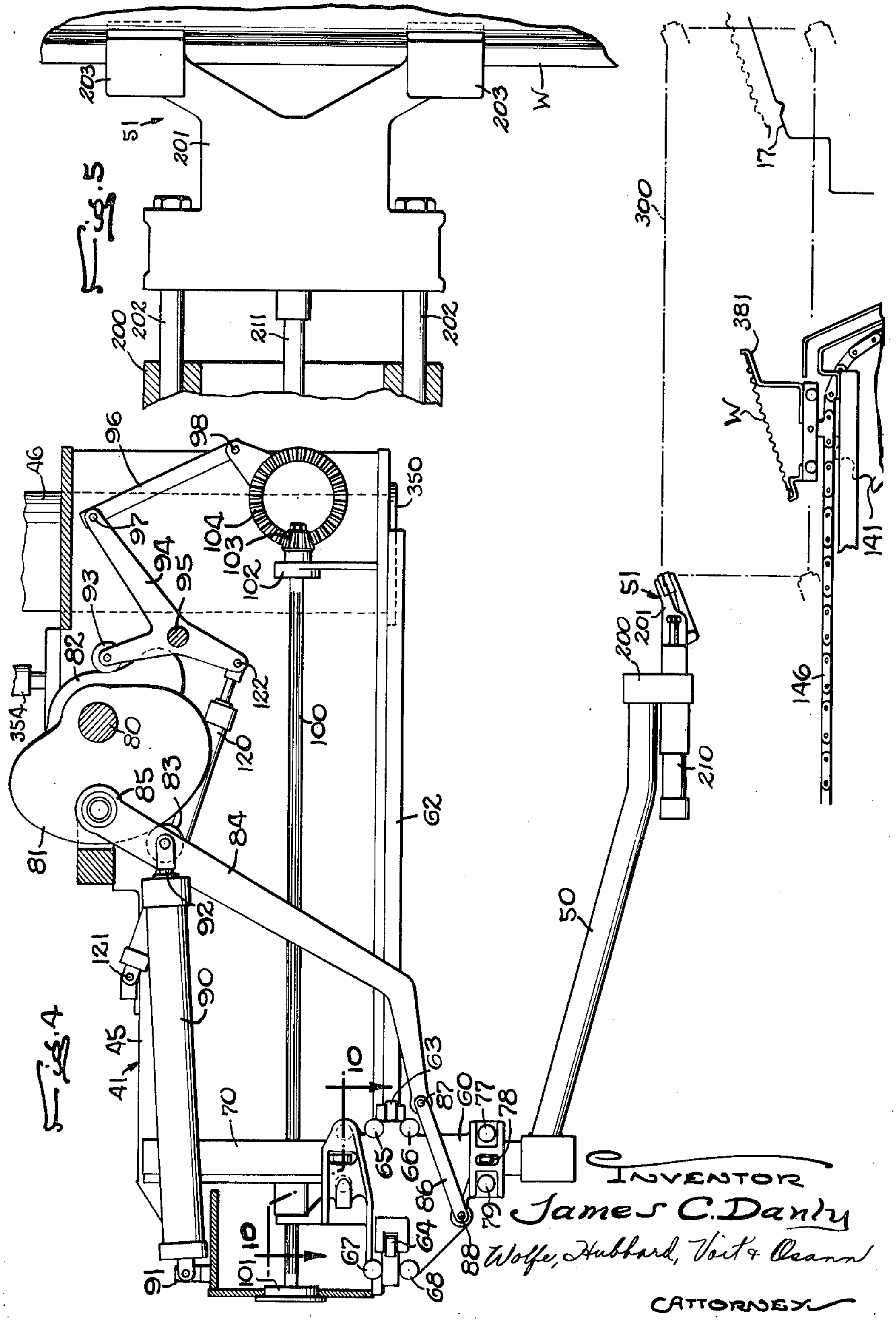
FIG. 4 is a vertical longitudinal section taken through one of the transfer mechanisms and looking along the line 4—4 of FIG. 2.
FIG. 5 is a fragmentary top view of a typical gripping mechanism.

In accordance with one of the aspects of the invention provision is made for swinging the transfer arm brackets and the conveyors into an out-of-the-way position, folded adjacent the upper portion of the press, for the purpose of establishing a clear area between adjacent presses for access of a crane hook to facilitate changing the dies and to facilitate normal maintenance as well as to permit the presses to operate on an individual basis when line operation is not required. Thus I provide a sleeve joint between the post 46 and the bracket 45, with the bracket being held captive by an end cap 350 (see FIGS. 1 and 4) permitting the bracket to occupy a working position shown at 351 and an idle, out-of-the-way position shown at 352 (see FIG. 2). In order to avoid having to break the driving connection when the transfer mechanism is swung to one side, the vertical drive shaft 155 referred to in connection with the discussion of FIG. 3 preferably includes telescoping type universal joints 353, 354 to accommodate the lateral movement. It will be seen in FIG. 2 that the amount of overhang of the supporting bracket is indeed minimized when the transfer mechanism is not in use.

With regard to moving the conveyors to a similar out-of-the-way position, two separate steps of movement are utilized. The conveyor structure is, first of all, mounted for transverse movement by fitting the supporting structure or base 135 on rollers 360 which ride on a pair of transversely arranged tracks 361, 362. Moreover, a hinge joint 370 is provided between the base 135 and conveyor frame 136 to permit the conveyor frame to be swung bodily upward from the position shown in full lines in FIG. 1 to the dotted position indicated at 375 in that figure. To this end the supporting leg 147 at the far end is pivoted to the end of the press frame at its upper end 376 and disengageably anchored to the floor at its lower end 377. When not in use the supporting leg 147 simply swings downwardly into nested position against the conveyor in the manner of a leg on a train gate. It is a simple matter to slip the drive shaft 177 clear when the conveyor is moved to its inactive position and the construction may be readily modified, if desired, to include a telescoping type joint if additional convenience is desired. This arrangement, leaving an entirely clear area between the presses free of any overhead obstruction, is to be contrasted with simply raising a conveyor to an upraised position not capable of admitting a crane hook. Moreover, with the transfer mechanism and conveyor out of the way, the presses may be operated in the conventional way, hand fed and in the "run" mode during times when "line" operation is not required.

In accordance with one of the more detailed features of the present invention each of the conveyors provides a plural set of workpiece holders interspersed with one another at incremental positions along the conveyor in order to bring a select set of workholders into active indexed position. Thus I provide a first set of workholders 381 and a second set of workholders 382 (FIG. 12), the workholders of each set being spaced at the incremental distance *d*. The change in phasing of the conveyor is a matter well within the skill of the art and can be effected by a press operator in a few minutes' time. This permits closely spaced runs of two or more types of workpieces, adding considerable flexibility to the operation of the line.

The present arrangement has been found particularly desirable for the handling of workpieces having substantial length and fed broadwise into each of the successive passes. An example of such a workpiece is a radiator grill which may be five or six feet in length but only about a foot or less in width as measured along the direction of movement. A gripper having laterally spaced jaws (FIG. 5) is useful for supporting such long workpieces and, if desired, the transfer arm 50, instead of being unitary as shown, may be made of wishbone shape providing grippers at its ends which may, for example, be spaced several feet from one another. Laterally adjustable rails 391, 392 insure that the workpiece is kept in a centered position.

While the press line is well suited for handling long workpieces, it will be apparent to one skilled in the art that the press line is not at all limited to handling workpieces of a particular shape and the line may be employed, with a high degree of flexibility, for making workpieces of a wide range of size and shape in a series of press operations. All that is required is the changing of dies and the substitution of differently shaped workholders on the conveyors. Moreover, while an air operated clamp has been disclosed for gripping the workpiece, which is convenient where the workpiece has a gripping flange along the edge thereof, many different types of clamps or work engaging members may be substituted, for example, inflated quills or fingers which are inserted into the workpiece from the top and received in grill spaces or other apertures. The direction of fixed approaching and retreating movement of the gripper element relative to the workpiece may be either horizontal or vertical, or anything inbetween being limited only by the envelope 300. Thus the present transfer mechanism is more flexible in the variety of possible gripper elements than competing designs, for example, those in which the transfer arm is fixedly pivoted and where the end of the arm is constrained to a particular path or type of movement.

The transfer mechanism discussed above is inherently safe to personnel, with the transfer arm 50 in each case occupying a compact folded back position relative to its supporting bracket. Nor is there any possibility of damage to the transfer mechanism upon inadvertently striking an object since the advancing movement is under the control of the air rams 90, 120 which are supplied with air at a regulated pressure, a pressure which may be adjusted to provide yielding whenever a predetermined force is exceeded.

The action is inherently precise since the mechanism is free of play and since the transfer arm 50 may be kept short and relatively stiff, which is to be contrasted with prior devices requiring a transfer arm of substantially greater length. The grippers are timed to operate at the ends of the stroke when the transfer arms are momentarily at rest so that there is no tendency to throw or dislodge a workpiece incident to depositing it in position either on the conveyor or within the working area of the press.

In spite of the improved accuracy, the press line does not require either maintenance or adjustment and is capable of operating for long press runs with a percentage of "down" time no greater than that required for presses not having the automatic press line features.

*Direct transfer without separate conveyor*

Figure 18:
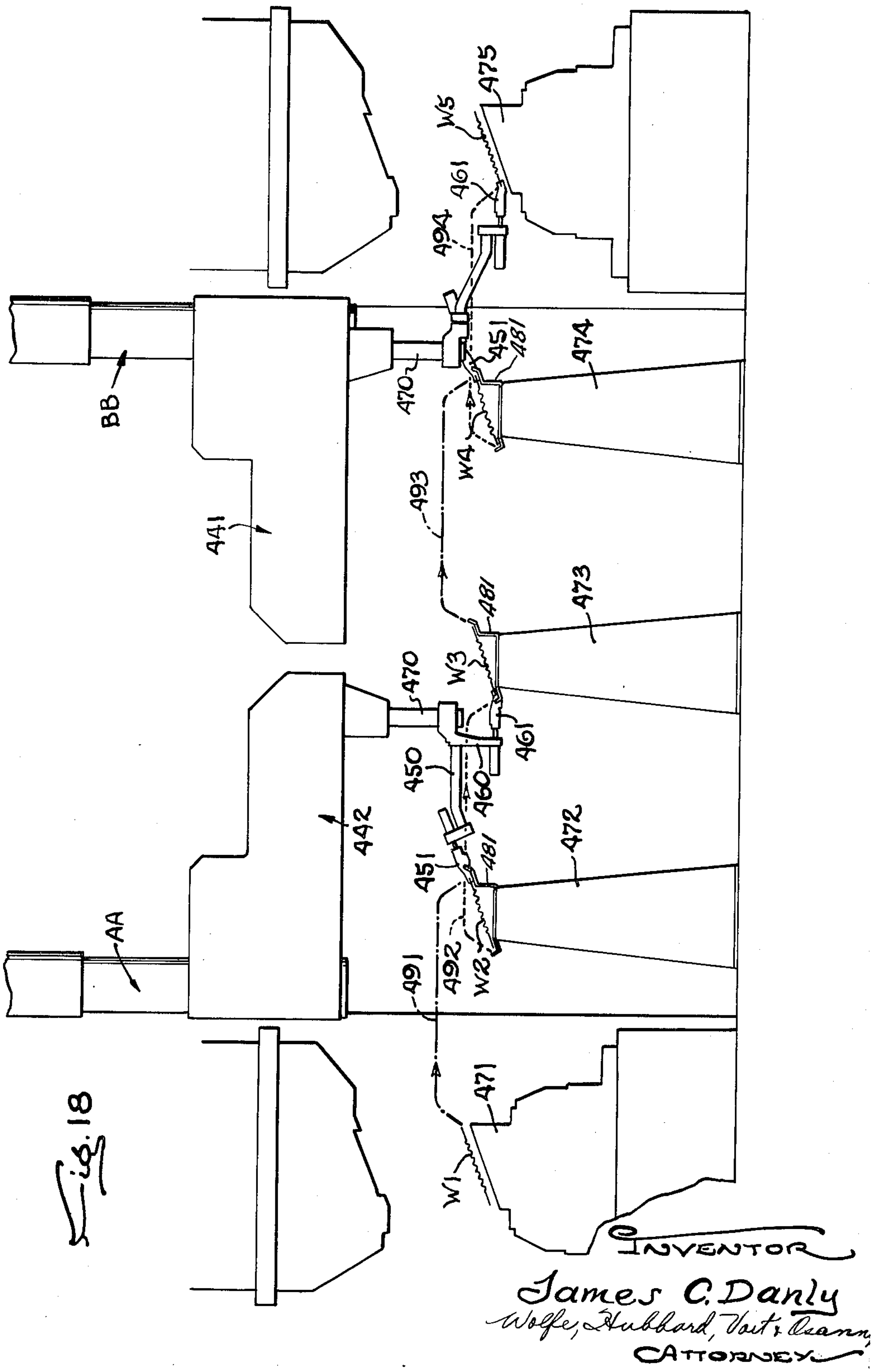
FIG. 18 is a side view of a portion of a press line employing an alternate transfer arrangement in which each of the transfer mechanisms services two intervals thus performing the function of an interposed conveyor.

In accordance with one of the aspects of the present invention I propose a modification in which a workpiece may be conveyed directly from one mechanism to the next without necessity for depositing it on a separate conveyor. Thus, referring to FIG. 18, there is shown a press line, the first two presses of which have been shown as AA and BB corresponding to presses A and B in the previous version. The presses may be considered identical to those earlier described and corresponding reference numerals have been employed, in the 400 series, to indicate corresponding parts. Thus it will be understood that the transfer mechanisms, indicated at 441, 442 have the same internal construction and are driven in the same way from the associated press drive and that the presses are synchronized by the same synchronizing means as set forth in FIGS. 14, 15.

In carrying out the invention stationary storage stations are provided between adjacent presses forming an equally spaced series with respect to the work stations in the presses, and the transfer devices are provided with an auxiliary gripper spaced from the main gripper in the direction of movement, for conveying workpieces over successive transfer intervals. Taking the transfer mechanism 442 at the output of press AA as representative, the reciprocating head 470 thereof has a first gripper arm 450 carrying a gripper 451 at its end as well as a second gripper arm 460 carrying a gripper 461, with the grippers 451, 461 being spaced, as shown, along the direction of movement. Associated with the transfer mechanism 442 are a series of stations equally spaced from one another, the first station being the work station 471 in the press, the second station being in the form of a pedestal 472 and the third station in the form of a pedestal 473. The latter have suitable workholders 481 for receiving and cradling the workpieces for temporary storage as they are moved along the press line.

The successive transfer mechanism 441 at the input side of press BB similarly cooperates with three evenly spaced stations, the station 473 which serves as a transfer station, the central station 474 and work station 475 in press BB. This pattern may be extended to as many presses as are necessary to complete the press line.

As in the previous embodiment, the actuating cams within the transfer mechanism are tailored to produce an arched path for the transfer head 470. Thus the gripper 451 follows the path 491 from the work station in the first press to the temporary storage pedestal 472. The gripper 461 follows the path 492 of the same profile from the pedestal 472 to the pedestal 473. The gripper 451 of the next adjacent transfer mechanism follows the arched path 493 and the gripper 461 thereof follows the path 494. In operation, then, a workpiece starting in press AA successively follows the transfer paths 491–494 in passing to the second press in line.

In reviewing the operation it will be assumed that all of the stations 471–475 are occupied by workpieces W1–W5, respectively. It will be assumed further that press AA is in the final portion of its active stroke so that the work area will be free for timed access of the gripper 451. When the grippers 451, 461 are released by their actuating mechanisms, being retracted away from the flanges which they engage on a workpiece, gripper 451 moves upwardly and to the left along the path 491 while the gripper 461 moves upwardly and to the left along the path 492. As the gripper 451 reaches the left-hand end of its movement it occupies a position at the leading edge of the workpiece W1 while the gripper 461 occupies a position at the trailing edge of the workpiece W2. With the head momentarily at rest in its left-hand end position, the grippers 451, 461 are actuated by any synchronously timed means, both grippers extending, and clamping onto, the respective workpieces W1, W2. Synchronized with the movement just described, although not necessarily in identical phase, the gripper 451 of the transfer mechanism 441, moves to its left-hand position gripping the workpiece W3 and the gripper 461 associated therewith grips the trailing edge of the workpiece W4. The stage is thus set for the active or transport portion of the cycle.

Upon right-hand movement of the head 470, moving the grippers along the paths 491, 492, respectively, the workpiece W1 is transferred to the second station 472 and the workpiece W2 is transferred from the second station to the third station 473. Similarly the grippers on the transfer mechanism 441 cause the workpiece W3 to be advanced to the fourth station and the workpiece W4 at the fourth station to move into the fifth station wihin the work area of the press BB.

It will be apparent, then, that each of the transfer mechanisms 441, 442, employing two grippers thereon spaced in the direction of movement, is caused to do double duty, conveying the workpiece over the distance normally bridged by the intermittently operating conveyor.

While pedestals are shown at the temporary storage stations, it will be apparent to one skilled in the art that the term "station" refers primarily to location and these pedestals are not required at points of transfer between adjacent mechanisms. Thus, if desired, the pedestal at station 473 may be omitted and the workpiece may be passed directly from the gripper 461 associated with the mechanism 442 to the gripper 451 of the adjacent transfer mechanism. The pedestals are removable for access.

In accordance with one of the more detailed features of the invention, the grippers 451, 461, which are secured to the same head, face in opposite directions, engaging the leading and trailing edges of the workpieces respectively, so as to avoid any necessity for overlap between the grippers of adjacent mechanisms. The large vertical component of movement at the end of the gripper stroke, which is inherent in use of an arched path insures positive, registered seating at the work and storage stations while the horizontal component of movement of the individual grippers insures positive clearance with respect to the engaged flanges of the workpieces. However it will also be understood by one skilled in the art that the invention is not limited to the particular grippers shown or the gripping of flanges at the leading and trailing edges; any means capable of providing positive support and quick engagement and release may be used and, if desired, the actuating cams within the transfer mechanisms may be tailored to produce an optimum path of approaching and retreating movement depending upon the type of gripper which is used.

While the transfer mechanism embodied in the bracket housings has particular utility when used in an automatically transferring press line, as described, it will be apparent to one skilled in the art that certain of the features and advantages thereof may be utilized in a more simplified arrangement including a single mechanism for feeding a workpiece either into or out of a single press. Where such usage is desired, the transfer mechanism may be powered from the associated press as set forth in FIG. 3 or may be provided with a separate drive motor and single revolution clutch without departing from the present invention and with the single revolution clutch being triggered by the press slide, by an interlock actuated by arrival of a workpiece at an associated storage station or by completion of some previous operation.

Moreover while the invention has been discussed in connection with automation of a line of power presses, it will be apparent that the invention in its broader aspects may be applied with equal benefit to other specific production lines, and, consequently, the terms "press line" and "press" may be broadly construed to include analogous means for performing successive operations on a workpiece.

In the following claims reference to "synchronous driving" or "synchronous movement" will be understood to refer to movement which is precisely timed to produce the sequential interaction which has been discussed and the terms are not intended to imply movement "in phase." Also in this connection the term "coupling" does not necessarily imply direct mechanical coupling and the coupling may be indirect, as, for example, where two separate drives are synchronized by synchro circuitry of the type discussed above. The term "work area" denotes the area under the slide and in which the workpiece is operated upon.

It will be apparent also that the term "conveyor" covers the conveying action of the auxiliary grippers in that the "dwell" period referred to in the claims refers to that period when the workpiece is stationary between the time that it is released and re-gripped.

I claim as my invention:

1. In a press line for performing a series of press operations on a workpiece, the combination comprising a power press having a frame and a slide defining a work area as well as a motor and output control device for driving the slide, a transfer mechanism for conveying a workpiece into the work area, said transfer mechanism including a horizontally extending bracket cantilever supported on the frame of the press on one side thereof, a carrier longitudinally movable in the bracket, a post vertically movable in the carrier, a gripper arm secured to the lower end of the post and extending in folded-back relation under the bracket and in the direction of the work area, a drive shaft journaled in the bracket and coupled to the motor output, said drive shaft having a pair of cams and associated cam followers coupled to the carrier and post respectively for achieving compound horizontal and vertical reciprocating movement of the arm into and out of the work area of the press, and a gripper at the end of the arm for engaging and disengaging a workpiece at its limits of movement.

2. In a press line for performing a series of press operations on a workpiece the combination comprising, a series of power presses each having an individual driving motor, press slide and work area, conveyors extending between the working areas of adjacent presses from the output side of one press to the input side of the next, each press having a first transfer mechanism at the input for loading a workpiece from the conveyor at the input side into the work area and a second transfer mechanism for unloading the workpiece from the work area to the conveyor at the output side, said transfer mechanisms each including a gripper arm together with means for guiding the arm along a predetermined arched path of movement, means for coupling the transfer mechanisms associated with a given press and at least one of the adjacent conveyors to the press slide so that the movements thereof are timingly coordinated with the movements of the press slide, means for synchronizing the outputs of the press drive motors, said conveyors each including an intermittent drive coupling providing a dwell period at the points of unloading and loading to insure proper engagement and disengagement of the workpiece by the transfer mechanisms notwithstanding minor variations in synchronism between the outputs of the drive motors of adjacent presses.

3. In a press line for performing a series of press operations on a workpiece, the combination comprising a series of power presses each having a slide defining a work area and a driving motor for the slide, conveyors extending between the work areas of adjacent presses from the output side of one press to the input side of the next, each press having a first transfer mechanism at the input side for loading the workpiece from the conveyor and a second transfer mechanism at the output side for unloading the workpiece onto the next conveyor, means for effecting continuous synchronized driving of the slides, transfer mechanisms and conveyors, said conveyors including means providing a dwell period at the points of unloading and loading to insure proper engagement and disengagement of a workpiece by the transfer mechanisms during constant driving of the press slide.

4. In a press line for performing a series of press operations on a workpiece, the combination comprising a series of power presses each having a slide defining a work area as well as a driving motor and a variably energizable output control device, conveyors extending between the work areas of adjacent presses from the output side of one press to the input side of the next, each press having a first transfer mechanism for loading a workpiece from the conveyor at the input side into the work area and a second transfer mechanism for loading the workpiece from the work area to the conveyor at the output side, means for directly coupling the slide of a given press to the associated transfer mechanisms and to at least one of their adjacent conveyors, synchronizing means for continuously and variably energizing the output control devices to establish a predetermined phase position between the slides of the successive presses, said conveyors having means providing a dwell period at the points of unloading and loading to insure proper engagement and disengagement of the workpiece by the transfer mechanisms notwithstanding minor variations in synchronism of the presses.

5. In a press line for performing a series of press operations on a workpiece and providing a temporary storage station for the workpiece, the combination comprising a power press having a slide defining a work area as well as a driving motor and output control device for driving the slide, a transfer mechanism including a bracket secured to the press and extending over the storage station, a carrier longitudinally movable in the bracket, a post vertically movable in the carrier, a gripper arm secured to the lower end of the post and extending laterally in the direction of the work area, a drive shaft journaled in the bracket and coupled to the motor output, said drive shaft having a pair of cams arranged side by side thereon, means including cam followers coupled to the carrier and post respectively for causing the gripper arm to undergo compound horizontal and vertical reciprocation with the cams being so shaped that the gripper arm is guided through an arched path of movement, and gripper means at the end of the arm for gripping and releasing the workpiece at the ends of the stroke.

6. In a press line for performing a series of press operations on a workpiece and providing a temporary storage station, the combination comprising a power press having a slide defining a work area as well as a driving motor and output control device for driving the slide, a transfer mechanism including a bracket secured to the press and extending over the storage station, said bracket including a carrier longitudinally movable in the bracket, a post vertically movable in the carrier, a gripper arm secured to the lower end of the post and extending laterally in the direction of the work area, a drive shaft coupled to the motor output, said drive shaft having a horizontal positioning cam and cam follower coupled to the drive shaft for vertically positioning the post, said cam being so shaped that the gripper arm is guided along an arched path of movement in and out of the working area of the press.

7. In a press line for performing a series of press operations on a workpiece, the combination comprising a power press having a frame and a slide as well as a motor and output control device for driving the slide, a transfer mechanism for conveying a workpiece into the work area, said transfer mechanism including a horizontally extending bracket cantilever-supported on the frame of the press on one side thereof, a carrier longitudinally movable in the bracket, a post vertically movable in the carrier, a gripper arm secured to the lower end of the post and extending laterally of the post in the direction of the work area, a drive shaft journaled in the bracket and coupled to the motor output, said drive shaft having a pair of cams including a horizontal motion cam and associated cam followers coupled to the carrier and post respectively for achieving compound horizontal and vertical reciprocating movement, an air ram connected to the cam follower of the horizontal motion cam for driving the carrier in the direction of the work area under the control of the cam so that obstruction of the gripper arm in the path of forward movement is accompanied by separation between the horizontal motion cam and its cam follower free of any jamming at the cam surface.

8. In a press line for performing a series of press operations on successive workpieces, the combination comprising first and second power presses having frames spaced from one and another and each having a drive means and a work area, horizontally extending overhead brackets on each of the presses so arranged that in working position the brackets are in alinement substantially end to end, each of said brackets having a movable head supported at the underside thereof, each of said heads having a gripper arm secured thereto including a gripper at the end thereof, temporary storage station means including workpiece receptacles spaced from one another under said said brackets, means in said brackets coupled to the drive means of the associated presses for reciprocating the heads over an arched path of movement between the press working areas and the adjacent storage stations so that the workpieces are advanced in succession from press to press, said storage station means being mounted for removal and said brackets being hinged to the respective press frames for lateral swinging movement into an out-of-the-way position adjacent the press frames to provide access for a crane hook or the like between the presses.

9. In a press line for performing a series of press operations on a workpiece, the combination comprising a series of power presses each having a frame and slide defining a work area as well as a motor and output control device for driving the slide, each press having a first transfer mechanism for loading a workpiece into the working area and a second transfer mechanism for unloading the workpiece from the working area, said transfer mechanism each including a bracket secured cantilever fashion to the upper portion of the press frame and having an arm movably mounted in the bracket for compound horizontal and vertical movement into and out of the work area, and drive means for reciprocating the slide and arm, each of said brackets having a vertically oriented hinge connection for permitting the bracket to be swung from its fully extended position to a position alongside the press frame thereby opening up the space between the presses to access by a crane hook or the like for changing the dies of the press.

10. In a press line for performing a series of press operations on a workpiece, the combination comprising a series of power presses spaced in a row and each having a frame and reciprocating slide positioned over a work area together with a motor and output control device for driving the slide, means for synchronizing the motor outputs, conveyors extending between the working areas of adjacent presses, each press having a first transfer mechanism for loading a workpiece from the conveyor at the input side into the work area and a second transfer mechanism for unloading the workpiece from the work area to the conveyor at the output side, said transfer mechanisms each having a bracket cantilever-supported on the upper portion of the press frame, each of the transfer mechanisms further having a gripper arm extending in the direction of the work area together with means coupled to the motor for moving the arm along a predetermined path into and out of the work area, said conveyors having intermittent driving means coupled to the motor output of an adjacent press and providing a dwell period which is synchronized with the movement of the cooperating gripper arms, each of said brackets having a vertical hinge connection with the associated press frame for permitting the bracket to be swung horizontally into an out-of-the-way position along side of the press frame, and each of said conveyors having a horizontal hinge connection for permitting the conveyor to be moved laterally and swung vertically into an out-of-the-way position along side of the press frame thereby causing the space between the presses to be free for access of a crane hook for changing the press dies.

11. In a press line for performing a series of press operations on a workpiece, the combination comprising a series of power presses spaced in a row each having a frame and slide defining a work area and having a motor and output control device for operating the slide, horizontal conveyors extending between adjacent presses, each of the presses having a first transfer mechanism movable between a pickup station at the end of a conveyor and the work area and having a second transfer mechanism for transferring a workpiece from the work area to a dropoff station at the beginning of the successive conveyor, means for driving the transfer mechanisms in synchronism with the movement of the slide, means including an indexing drive connection between each of the conveyors and the motor output of one of the adjacent presses, each of said conveyors having first and second sets of work holders thereon interspersed with one another, drive means connected to the motor output of one of the adjacent presses for indexing the conveyor forwardly for dwell of the work holders in a given set at the pickup and dropoff stations, thereby permitting the press line to be employed for two types of workpieces without modification of the conveyor and simply by changing the phase of the indexing drive connection.

12. In a press line for performing a series of press operations on a workpiece, the combination comprising a power press having a frame and slide defining a work area and a motor and output control device for driving the slide, means for supporting the workpiece in the work area, a transfer mechanism for transferring a workpiece from a pickup station outside of the press into engagement with the supporting means, said transfer mechanism including a bracket cantilever-supported on the press frame and extending over the pickup station, a carrier mounted for horizontal movement in the bracket, a post mounted for vertical movement in the carrier, a gripper arm at the lower end of the post having a jaw type gripper at the end thereof, a drive shaft journaled in the bracket and having horizontal and vertical motion cams thereon including cam followers coupled to the carrier and post respectively, said drive shaft being coupled to the output of the motor for rotation in precise synchronism with the movement of the slide, said cams being individually profiled to produce compound movement of the gripper arm so that the same moves along an arched path having a large vertical component at the pickup station and at the supporting means in the work area, and a gripper operating mechanism interspersed between the gripper and the arm providing a horizontal component of movement for the jaws of the gripper incident to gripping and releasing of the workpiece.

13. In a press line for performing a series of press operations on a workpiece and including a series of equally spaced storage and work stations, the combination comprising a series of presses, means for driving the same in synchronism, a series of transfer mechanisms between the presses including a horizontally reciprocating carrier, a post vertically movable in the carrier, drive means for said carrier and said post synchronized with the press driving means so that the lower end of the post is guided along a predetermined arched path in synchronism with the operation of the adjacent presses, a first gripper arm secured to the post and having a gripper at its end for advancing a workpiece over the interval between two stations, and a second gripper arm secured to the post and having a gripper at its end and spaced from the first for advancing a workpiece over the next successive interval between two stations.

14. In a press line for performing a series of press operations on a workpiece and providing a series of work stations and storage stations, the combination comprising a series of presses, a transfer mechanism at the input side and the output side of each of the presses, each of such transfer mechanisms having a head which is moved along a predetermined arched path and over a distance which corresponds to the spacing between adjacent stations, a first gripper arm secured to the head and having a gripper at its end for engaging a workpiece and transporting it over an interval between adjacent stations, and a second gripper arm secured to the head and having a gripper at its end spaced from the gripper on the first arm for engaging and transporting the workpiece over the next interval between adjacent stations, all of said presses and all of said transfer mechanisms being coupled together for movement in synchronism during continuous operation of the presses.

15. In a press line for performing a series of press operations on a workpiece having an engaging surface along the leading and trailing edges thereof and in which the press line has a series of work stations and storage stations, the combination comprising a series of presses, transfer mechanisms arranged above said stations, each of said transfer mechanisms having a longitudinally and vertically reciprocating head constrained to move along a predetermined path, a first gripping mechanism on said head facing upstream for engaging the leading edge of the workpiece at one station and for transporting it to the next station, a second gripping mechanism on said head spaced downstream from the first gripping mechanism and facing downstream for engaging the trailing edge of the workpiece at the said next station and for transporting the same to the station following, and means for synchronizing the movements of the presses and transfer mechanisms.

16. In a press line for performing a series of press operations on a workpiece including a series of presses each having a work station and a plurality of storage stations equally spaced between the work stations, the combination comprising a plurality of transfer mechanisms at the input and output sides of the presses respectively and bridging the space between them, each of the transfer mechanisms having a head which reciprocates horizontally and vertically along a predetermined path of transfer movement, each of said transfer mechanisms having a first arm connected to the head extending horizontally in cantilever fashion and having a gripper for movement between the work station of the associated press and an adjacent storage station, a second arm connected to the head having a gripper thereon spaced from the first gripper for movement between adjacent storage stations so the workpieces are successively advanced from station to station, and means for synchronously driving said presses and said transfer mechanisms.

References Cited by the Examiner

UNITED STATES PATENTS

| | | | |
|---|---|---|---|
| 1,020,313 | 3/12 | Scheur | 198—115 |
| 2,815,866 | 12/57 | Watter | 100—207 X |

WALTER A. SCHEEL, *Primary Examiner.*